United States Patent
Lambert

(10) Patent No.: US 8,446,843 B2
(45) Date of Patent: *May 21, 2013

(54) RAPID LOCAL ADDRESS ASSIGNMENT FOR WIRELESS COMMUNICATION NETWORKS

(75) Inventor: Paul A. Lambert, Mountain View, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 13/568,641

(22) Filed: Aug. 7, 2012

(65) Prior Publication Data

US 2012/0300762 A1 Nov. 29, 2012

Related U.S. Application Data

(63) Continuation of application No. 12/549,464, filed on Aug. 28, 2009, now Pat. No. 8,238,315.

(60) Provisional application No. 61/097,380, filed on Sep. 16, 2008, provisional application No. 61/099,739, filed on Sep. 24, 2008.

(51) Int. Cl.
*H04L 29/12* (2006.01)
*H04W 48/10* (2009.01)

(52) U.S. Cl.
USPC .......................................... 370/254; 370/338

(58) Field of Classification Search
USPC ................................................. 370/338, 254
See application file for complete search history.

(56) References Cited

U.S. PATENT DOCUMENTS

| 8,238,315 | B2 * | 8/2012 | Lambert | 370/338 |
| 8,300,637 | B1 * | 10/2012 | Bennett et al. | 370/389 |
| 2006/0224704 | A1 * | 10/2006 | Parikh et al. | 709/220 |
| 2006/0250982 | A1 * | 11/2006 | Yuan et al. | 370/254 |
| 2007/0002833 | A1 | 1/2007 | Bajic | |
| 2008/0273485 | A1 | 11/2008 | Tsigler et al. | |
| 2009/0219834 | A1 | 9/2009 | Babbar et al. | |
| 2009/0222537 | A1 * | 9/2009 | Watkins et al. | 709/221 |

FOREIGN PATENT DOCUMENTS

JP 2007-081497 3/2007

OTHER PUBLICATIONS

ISO/IEC 8802-11, ANSI/IEEE Std. 802.11; First edition 1999-00-00; Information technology—Telecommunications and information exchange between systems—Local and metropolitan area networks—Specific requirements—Part 11: Wireless LAN Medium Access Control (MAC) and Physical Layer (PHY) specifications; Aug. 20, 1999; 531 pages.

(Continued)

*Primary Examiner* — Melvin Marcelo

(57) ABSTRACT

A method of operating a wireless communication device includes transmitting a query to a wireless network. The query requests information about a type of Internet Protocol (IP) address assignment in use on the wireless network. The method also includes receiving a reply from the wireless network, wherein the reply includes the information about the type of IP address assignment in use on the wireless network. The method further includes determining an IP address for the wireless communication device, including: only in response to the information about the type of IP address assignment in use on the wireless network, as set forth in the reply, indicating that dynamic host configuration protocol (DHCP) is in use by the wireless network, transmitting a DHCP discovery message to the wireless network in order to determine the IP address for the wireless communication device.

20 Claims, 4 Drawing Sheets

OTHER PUBLICATIONS

IEEE P802.11 Wireless LANs; Proposal for Native-GAS Query for IP Address Type availability; Gabor Bajko; Nokia; Jul. 14, 2008; 4 pages.

IEEE P802.11 Wireless LANs; Proposal for Addition of Personal Network to Network Types; Necati Canpolat; Intel Corporation; Sep. 9, 2008; 2 pages.

Notification of Transmittal of the International Search Report and the Written Opinion of The International Searching Authority, or The Declaration dated Dec. 11, 2009 in reference to PCT/US2009/055662.

Cheshire Apple Computer B. Aboba Microsoft Corporation; "Dynamic Configuration of 1Pv4 Link—Local Addresses"; May 2005.

B. Aboba Microsoft Corporation, J. Carlson, Sun Microsystems, Cheshire Apple Computer; "Detecting Network Attachment in 1Pv4 (DNAv4)"; Mar. 2006.

Summary of Notice of Reasons for Rejection for JP Patent Application No. 2011-526912; Ryuka IP Law Firm, Sep. 11, 2012, 2 pages.

* cited by examiner

RAPID LOCAL ADDRESS ASSIGNMENT FOR WIRELESS COMMUNICATION NETWORKS

CROSS-REFERENCE TO RELATED APPLICATIONS

This application is a continuation of U.S. patent application Ser. No. 12/549,464, filed on Aug. 28, 2009, which claims the benefit of U.S. Provisional Patent Application No. 61/097,380, filed on Sep. 16, 2008, and Application No. 61/099,739, filed on Sep. 24, 2008. The disclosures of the above applications are incorporated by reference herein in their entirety.

BACKGROUND

The present disclosure relates generally to the assignment of Internet Protocol (IP) addresses in wireless networks. More particularly, the present disclosure relates to increasing the speed of the assignment of IP addresses in wireless networks such as wireless local-area networks (WLANs).

Networking technologies such as WLAN require that a unique network address be assigned to each communicating device. IPv4 and IPv6 are the standard protocols used for these network communications, and have several ways in which the unique IPv4 or IPv6 device addresses can be assigned. The types of address assignment include static addressing, where the addresses are manually assigned by an administrator; dynamic addressing, where addresses are automatically assigned by a server, for example according to Dynamic Host Configuration Protocol (DHCP); and link-local addressing, where addresses are automatically assigned without a server.

Link-local addressing is useful in networks that are formed in an ad-hoc manner. These networks can include Wi-Fi Infrastructure, Wi-Fi IBSS, or Wi-Fi peer-to-peer networks. Such networks do not have centrally-coordinated address assignment or DHCP servers. According to applicable standards, a device having a link-local addressing mechanism first checks whether a DHCP server is available by sending DHCP requests. The device must retransmit the DHCP request multiple times before determining, after a significant delay, that no DHCP server is available. Only then does the device use link-local addressing to obtain a local address.

This delay presents a significant usability problem. Establishing a network connection between two devices can take 30 to 60 seconds just to determine whether DHCP is available. These long delays severely impact the user experience of mobile device connectivity.

SUMMARY

In general, in one aspect, an embodiment features an apparatus comprising: a receiver to receive a first wireless signal from a wireless network; an address module to determine a type of Internet Protocol address assignment employed by the wireless network based on the first wireless signal; and a connection module to establish a network-layer connection to the wireless network based on the type of Internet Protocol address assignment determined by the address module.

In general, in one aspect, an embodiment features a computer program comprising: instructions for determining a type of Internet Protocol address assignment employed by a wireless network based on a first wireless signal received from the wireless network; and instructions for establishing a network-layer connection to the wireless network based on the type of Internet Protocol address assignment determined by the address module.

In general, in one aspect, an embodiment features an apparatus comprising: a transmitter to transmit a first wireless signal, wherein the first wireless signal represents an indication of a type of Internet Protocol address assignment employed by a wireless network connected to the apparatus.

In general, in one aspect, an embodiment features a computer program comprising: instructions for causing transmission of a first wireless signal from a device, wherein the first wireless signal represents an indication of a type of Internet Protocol address assignment employed by a wireless network connected to the device.

The details of one or more implementations are set forth in the accompanying drawings and the description below. Other features will be apparent from the description and drawings, and from the claims.

Figure 1:
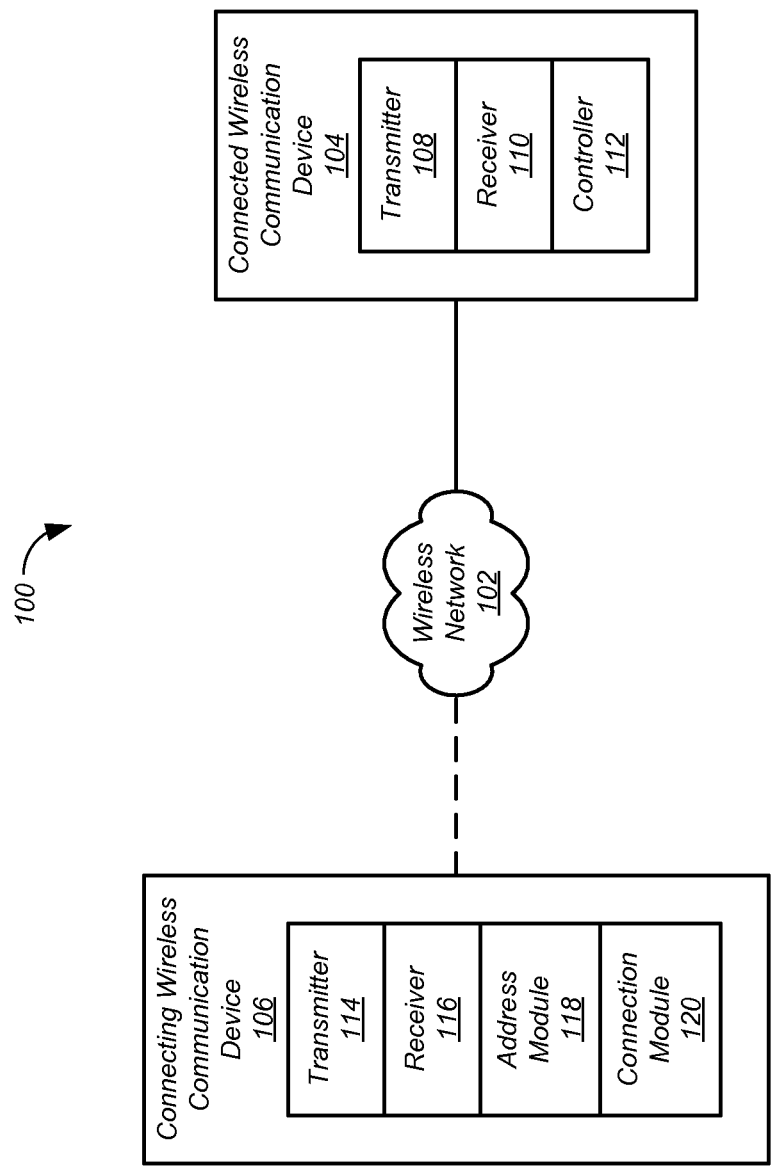
FIG. 1 shows elements of a communication system comprising a wireless network, a connected wireless communication device, and a connecting wireless communication device according to one embodiment.

The leading digit(s) of each reference numeral used in this specification indicates the number of the drawing in which the reference numeral first appears.

DESCRIPTION

Embodiments of the present disclosure provide elements of a communication system for rapid local address assignment. FIG. 1 shows elements of a communication system 100 comprising a wireless network 102 according to one embodiment. In some embodiments, wireless network 102 is implemented as a wireless local-area network (WLAN). In some embodiments, wireless network 102 is implemented in other ways. Although in the described embodiments, the elements of communication system 100 are presented in one arrangement, other embodiments may feature other arrangements. For example, elements of communication system 100 can be implemented in hardware, software, or combinations thereof.

Referring to FIG. 1, communication system 100 also includes a wireless communication device 104 connected to wireless network 102 and a wireless communication device 106 connecting to wireless network 102. For clarity, wireless communication device 104 is referred to herein as "connected" wireless communication device 104, while wireless communication device 106 is referred to herein as "connecting" wireless communication device 106.

Connected wireless communication device 104 includes a transmitter 108, a receiver 110, and a controller 112. Connecting wireless communication device 106 includes a transmitter 114, a receiver 116, an address module 118, and a connection module 120. Each of wireless communication devices 104 and 106 can be implemented as a switch, router, network interface controller (NIC), and the like. In some embodiments, connected wireless communication device 104 can be implemented as an access point or the like.

According to various embodiments, connecting wireless communication device 106 determines the type of IP address assignment employed by wireless network 102 based on signals received by connecting wireless communication device 106 from wireless network 102, for example including signals transmitted by connected communication wireless device 104. Connecting wireless communication device 106 then connects to wireless network 102 using the determined type of IP address assignment. This technique can greatly increase the speed of local address assignment, and therefore can greatly reduce the time required to connect to the network. For example, if connecting wireless communication device 106 determines that dynamic addressing is not used, connecting wireless communication device 106 can avoid checking whether a DHCP server is available by sending DHCP requests, thereby reducing network connection time by 30 to 60 seconds. Three embodiments are described below in detail. Other embodiments will be apparent after reading this disclosure.

Figure 2:
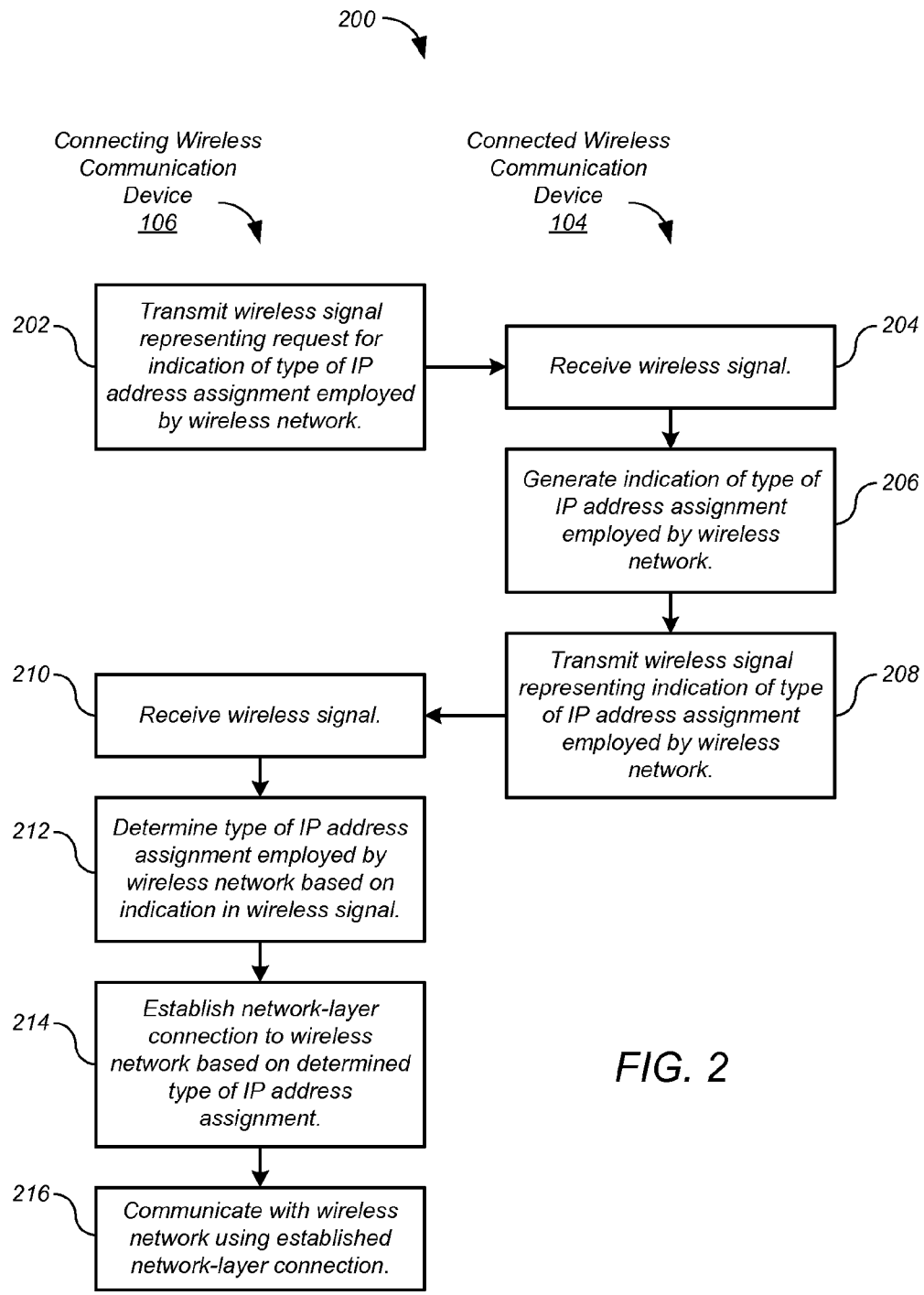
FIG. 2 shows a process for the communication system of FIG. 1 according to one embodiment where the connecting wireless communication device prompts the connected wireless communication device to transmit a wireless signal that indicates the type of IP address assignment employed by the wireless network.

In some embodiments, connecting wireless communication device 106 prompts connected wireless communication device 104 to transmit a wireless signal that indicates the type of IP address assignment employed by wireless network 102 FIG. 2 shows a process 200 for communication system 100 of FIG. 1 according to one such embodiment. Although in the described embodiments, the elements of the processes disclosed herein are presented in one arrangement, other embodiments may feature other arrangements, as will be apparent based on the disclosure and teachings provided herein. For example, in various embodiments, some or all of the steps of the disclosed processes can be executed in a different order, concurrently, and the like.

Referring to FIG. 2, transmitter 114 of connecting wireless communication device 106 transmits a wireless signal representing a request for an indication of the type of IP address assignment employed by wireless network 102 (step 202). Receiver 110 of connected wireless communication device 104 receives the wireless signal (step 204). In response, controller 112 of connected wireless communication device 104 generates an indication of the type of IP address assignment employed by wireless network 102 (step 206).

Transmitter 108 of connected wireless communication device 104 transmits a wireless signal that represents the indication of the type of IP address assignment employed by wireless network 102 (step 208). In some embodiments, the wireless signal transmitted by connecting wireless communication device 106 represents an IEEE 802.11 Probe Request Frame, and the wireless signal transmitted by connected wireless communication device 104 represents an IEEE 802.11 Probe Response Frame. In other embodiments, both wireless signals represent IEEE 802.11 Action Frames. In these IEEE 802.11 embodiments, the indication can be provided as an Information Element. In some embodiments, Wi-Fi Protected Setup (WPS) protocols defined by the Wi-Fi Alliance are used to carry this information in a secure manner, either alone or to securely augment the information carried by beacons and probes. Of course, other messages can be used, for example including link-level messages such as Extensible Authentication Protocol (EAP) messages, Logical Link Control (LLC) messages, unassociated multicast messages, and the like.

The indication of the type of IP address assignment employed by wireless network 102 can indicate a link-local address assignment type, a dynamic address assignment type, a static address assignment type, and the like. Alternatively, the indication can indicate the type(s) of IP address assignment that are not available. For example, the indication could indicate that dynamic addressing is not available.

Receiver 116 of connecting wireless communication device 106 receives the wireless signal (step 210). Based on the indication in the wireless signal received from connected wireless communication device 104, address module 118 of connecting wireless communication device 106 determines the type of IP address assignment employed by wireless network 102 (step 212). Connection module 120 of connecting wireless communication device 106 then establishes a network-layer connection to wireless network 102 based on the type of IP address assignment determined by address module 118 (step 214). Thereafter, connected wireless communication device 104 communicates with wireless network 102 using that connection (step 216).

Figure 3:
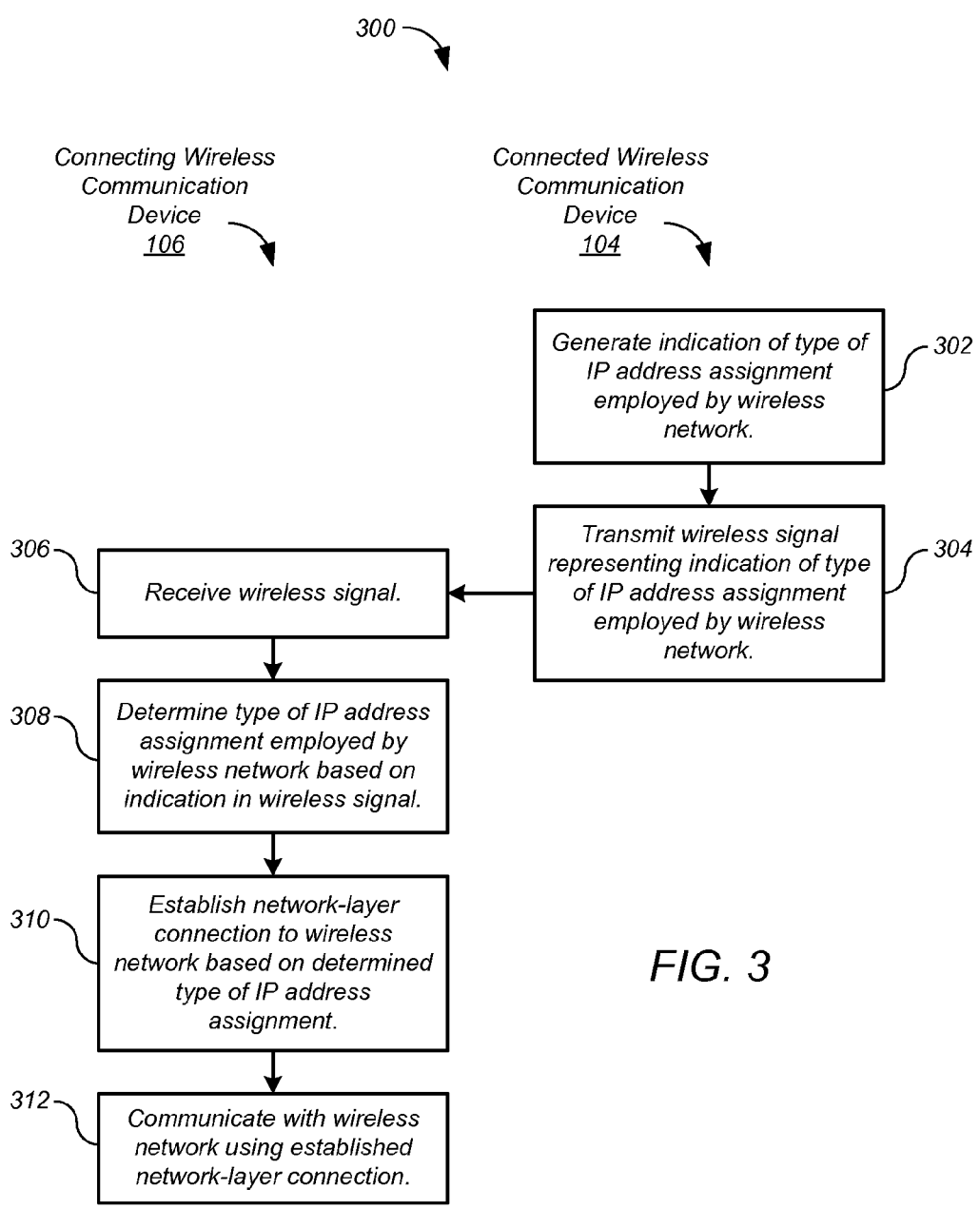
FIG. 3 shows a process for the communication system of FIG. 1 according to one embodiment where the connected wireless communication device transmits a signal that indicates the type of IP address assignment employed by the wireless network without prompting from the connecting wireless communication device.

In some embodiments, connected wireless communication device 104 transmits a signal that indicates the type of IP address assignment employed by wireless network 102 without prompting from connecting wireless communication device 106. FIG. 3 shows a process 300 for communication system 100 of FIG. 1 according to one such embodiment.

Referring to FIG. 3, controller 112 of connected wireless communication device 104 generates an indication of the type of IP address assignment employed by wireless network 102 (step 302). Transmitter 108 of connected wireless communication device 104 transmits a wireless signal that represents the indication of the type of IP address assignment employed by wireless network 102 (step 304). In some embodiments, the wireless signal transmitted by connected wireless communication device 104 represents an IEEE 802.11 Beacon Frame. The indication of the type of IP address assignment employed by wireless network 102 can indicate a link-local address assignment type, a dynamic address assignment type, a static address assignment type, and the like. Alternatively, the indication can indicate the type(s) of IP address assignment that are not available. For example, the indication could indicate that dynamic addressing is not available.

Receiver 116 of connecting wireless communication device 106 receives the wireless signal (step 306). Based on the indication in the signal received from connected wireless communication device 104, address module 118 of connecting wireless communication device 106 determines the type of IP address assignment employed by wireless network 102 (step 308). Connection module 120 of connecting wireless communication device 106 then establishes a network-layer connection to wireless network 102 based on the type of IP address assignment determined by address module 118 (step 310). Thereafter, connected wireless communication device 104 communicates with wireless network 102 using that connection (step 312).

Figure 4:
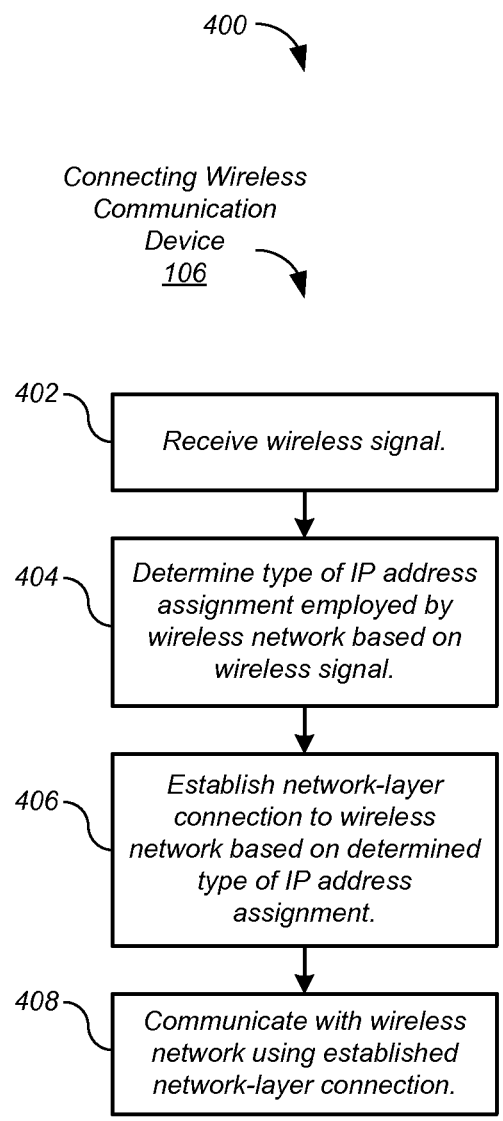
FIG. 4 shows a process for the communication system of FIG. 1 according to one embodiment where the connecting wireless communication device determines the type of IP address assignment employed by the wireless network based on wireless signals received from the connected wireless communication device that do not include an indication of the type of IP address assignment employed by the wireless network.

In some embodiments, connecting wireless communication device 106 determines the type of IP address assignment employed by wireless network 102 based on wireless signals received from connected wireless communication device 104 that do not include an indication of the type of IP address assignment employed by wireless network 102. FIG. 4 shows a process 400 for communication system 100 of FIG. 1 according to one such embodiment.

Referring to FIG. 4, receiver 116 of connecting wireless communication device 106 receives a wireless signal transmitted by transmitter 108 of connected wireless communication device 104 (step 402). The reception techniques employed can include packet sniffing, snooping, direct reception, and the like.

Based on the wireless signal, address module 118 of connecting wireless communication device 106 determines the type of IP address assignment employed by wireless network 102 (step 404). For example, address module 118 can determine the type of IP address assignment based on the type of addresses observed in packets represented by the wireless signal. For example, address module 118 could observe the IP address of connected wireless communication device 104 in the wireless signal. Address module 118 can tell if wireless network 102 employs link-local addressing by observing that the IP address is a link-local address. As another example, address module 118 can determine the type of IP address assignment based on the observation of a Time-To-Live (TTL) parameter represented by the wireless signal. Of course, other characteristics of the packets represented by the wireless signal can be used.

Connection module 120 of connecting wireless communication device 106 then establishes a network-layer connection to wireless network 102 based on the type of IP address assignment determined by address module 118 (step 406). Thereafter, connected wireless communication device 104 communicates with wireless network 102 using that connection (step 408).

Various embodiments can be implemented in digital electronic circuitry, or in computer hardware, firmware, software, or in combinations of them. Embodiments can be implemented in a computer program product tangibly embodied in a machine-readable storage device for execution by a programmable processor; and method steps can be performed by a programmable processor executing a program of instructions to perform functions by operating on input data and generating output. Embodiments can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the scope of the disclosure. Accordingly, other implementations are within the scope of the following claims.

What is claimed is:

1. A wireless communication device comprising:
 a transmitter configured to transmit a query to a wireless network, wherein the query requests information about a type of Internet Protocol (IP) address assignment in use on the wireless network;
 a receiver configured to receive a reply from the wireless network, wherein the reply includes the information about the type of IP address assignment in use on the wireless network; and
 an address module configured to determine an IP address for the wireless communication device,
 wherein, in determining the IP address for the wireless communication device, the address module is configured to
  only in response to the information about the type of IP address assignment in use on the wireless network, as set forth in the reply, indicating that dynamic host configuration protocol (DHCP) is in use by the wireless network, instruct the transmitter to transmit a DHCP discovery message to the wireless network in order to determine the IP address for the wireless communication device.

2. The wireless communication device of claim 1, wherein:
 the receiver is configured to receive a DHCP offer message in response to the DHCP discovery message, and
 the address module is configured to selectively use an IP address included in the DHCP offer message as the IP address for the wireless communication device.

3. The wireless communication device of claim 1, wherein the transmitter is configured to, subsequent to the address module determining the IP address for the wireless communication device, transmit packets to the wireless network, wherein a source address of the packets is set to the IP address for the wireless communication device.

4. The wireless communication device of claim 1, wherein the reply comprises a beacon frame compatible with IEEE 802.11.

5. The wireless communication device of claim 1, wherein the query comprises a probe request frame compatible with IEEE 802.11.

6. The wireless communication device of claim 5, wherein the reply comprises a probe response frame compatible with IEEE 802.11.

7. The wireless communication device of claim 1, wherein the address module is configured to, in response to the information about the type of IP address assignment in use on the wireless network, as set forth in the reply, indicating that link local addressing is in use by the wireless network, select a link local address as the IP address for the wireless communication device.

8. The wireless communication device of claim 1, wherein the address module is configured to, in response to receiving no answer to the DHCP discovery message, select a link local address as the IP address for the wireless communication device.

9. The wireless communication device of claim 8, wherein the address module is configured to wait for a predetermined period of time before determining that no answer to the DHCP discovery message has been received.

10. The wireless communication device of claim 1, wherein the address module is configured to use a static address in response to the information about the type of IP address assignment in use on the wireless network, as set forth in the reply, indicating that static address assignment is in use by the wireless network.

11. A method of operating a wireless communication device, the method comprising:

transmitting a query to a wireless network, wherein the query requests information about a type of Internet Protocol (IP) address assignment in use on the wireless network;

receiving a reply from the wireless network, wherein the reply includes the information about the type of IP address assignment in use on the wireless network; and determining an IP address for the wireless communication device, wherein the determining includes, only in response to the information about the type of IP address assignment in use on the wireless network, as set forth in the reply, indicating that dynamic host configuration protocol (DHCP) is in use by the wireless network, transmitting a DHCP discovery message to the wireless network in order to determine the IP address for the wireless communication device.

12. The method of claim 11, further comprising:

receiving a DHCP offer message in response to the DHCP discovery message; and selectively using an IP address included in the DHCP offer message as the IP address for the wireless communication device.

13. The method of claim 11, further comprising, subsequent to determining the IP address for the wireless communication device, transmitting packets to the wireless network, wherein a source address of the packets is set to the IP address for the wireless communication device.

14. The method of claim 11, wherein the reply comprises a beacon frame compatible with IEEE 802.11.

15. The method of claim 11, wherein the query comprises a probe request frame compatible with IEEE 802.11.

16. The method of claim 15, wherein the reply comprises a probe response frame compatible with IEEE 802.11.

17. The method of claim 11, further comprising, in response to the information about the type of IP address assignment in use on the wireless network, as set forth in the reply, indicating that link local addressing is in use by the wireless network, selecting a link local address as the IP address for the wireless communication device.

18. The method of claim 11, further comprising, in response to receiving no answer to the DHCP discovery message, selecting a link local address as the IP address for the wireless communication device.

19. The method of claim 18, further comprising waiting for a predetermined period of time before determining that no answer to the DHCP discovery message has been received.

20. The method of claim 11, further comprising using a static address in response to the information about the type of IP address assignment in use on the wireless network, as set forth in the reply, indicating that static address assignment is in use by the wireless network.

\* \* \* \* \*